(12) United States Patent
Schilling

(10) Patent No.: US 6,869,093 B2
(45) Date of Patent: Mar. 22, 2005

(54) TRAILER AND KIT

(75) Inventor: Harold M. Schilling, Mosinee, WI (US)

(73) Assignee: HMS Lift, LLC, Mosinee, WI (US)

( * ) Notice: Subject to any disclaimer, the term of this patent is extended or adjusted under 35 U.S.C. 154(b) by 14 days.

(21) Appl. No.: 10/264,845

(22) Filed: Oct. 4, 2002

(65) Prior Publication Data

US 2004/0066026 A1 Apr. 8, 2004

(51) Int. Cl.$^7$ ............................................. B62D 53/00
(52) U.S. Cl. ................... 280/406.2; 414/481; 414/482; 414/483
(58) Field of Search ..................... 280/406.2, 479.1, 280/402; 414/481, 482, 483

(56) References Cited

U.S. PATENT DOCUMENTS

| | | | | |
|---|---|---|---|---|
| 3,536,214 A | * | 10/1970 | Sorg et al. | 414/537 |
| 3,720,336 A | * | 3/1973 | Murray et al. | 414/470 |
| 3,945,521 A | * | 3/1976 | Decker | 414/483 |
| 4,822,069 A | * | 4/1989 | Burgess | 280/402 |
| 4,995,129 A | * | 2/1991 | Comardo | 14/71.1 |
| 5,016,896 A | * | 5/1991 | Shafer | 280/400 |
| 5,105,908 A | | 4/1992 | Freund | |
| 5,320,371 A | | 6/1994 | Levad | |
| 5,340,145 A | | 8/1994 | Leib et al. | |
| 5,393,083 A | | 2/1995 | Mally | |
| 5,474,320 A | * | 12/1995 | Bojarski et al. | 280/5.521 |
| 5,607,176 A | | 3/1997 | Leib et al. | |
| 5,829,536 A | * | 11/1998 | Pigg et al. | 172/482 |
| 6,042,135 A | * | 3/2000 | Ross | 280/456.1 |
| 6,086,082 A | * | 7/2000 | Andol | 280/414.1 |
| 6,254,117 B1 | | 7/2001 | Cross | |
| 6,540,245 B1 | * | 4/2003 | Shankle et al. | 280/414.1 |

\* cited by examiner

*Primary Examiner*—Paul N. Dickson
*Assistant Examiner*—Toan C To

(57) ABSTRACT

A trailer comprises two elongate panels as loading ramp panels. A wheel assembly supports the panels and a trailer drawbar having a first end for connection with a draft vehicle and a second end which is secured with the wheel assembly by a first fastener and a second fastener secures the panels to the drawbar at a point spaced from the wheel assembly. A kit for utilizing two panels in a trailer comprises a wheel assembly, a drawbar and first and second fasteners for securing, respectively, the second end of the drawbar with the wheel assembly and the panels to the drawbar at a point spaced from the wheel assembly.

10 Claims, 2 Drawing Sheets

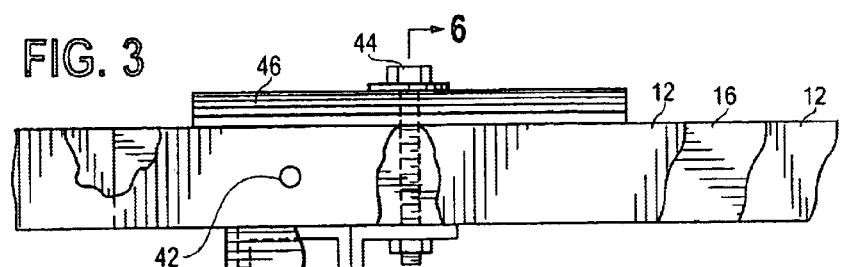
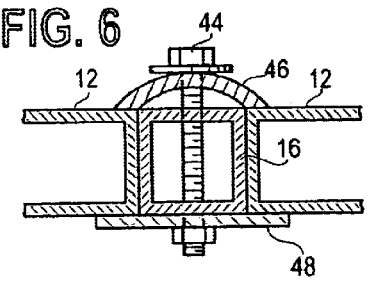
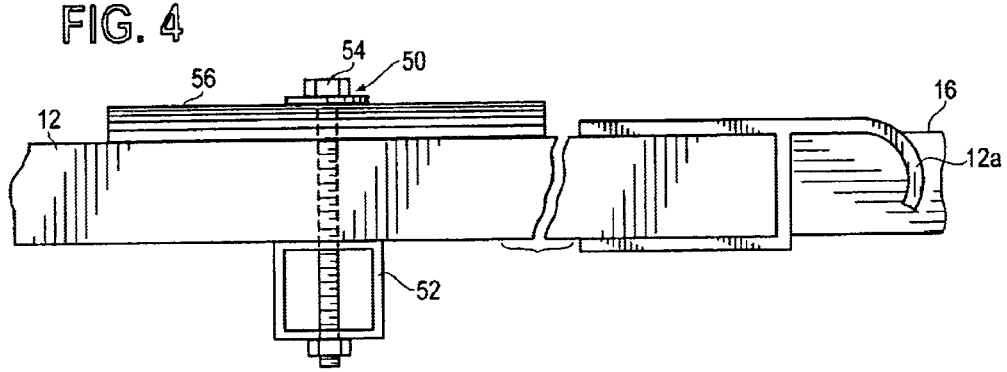
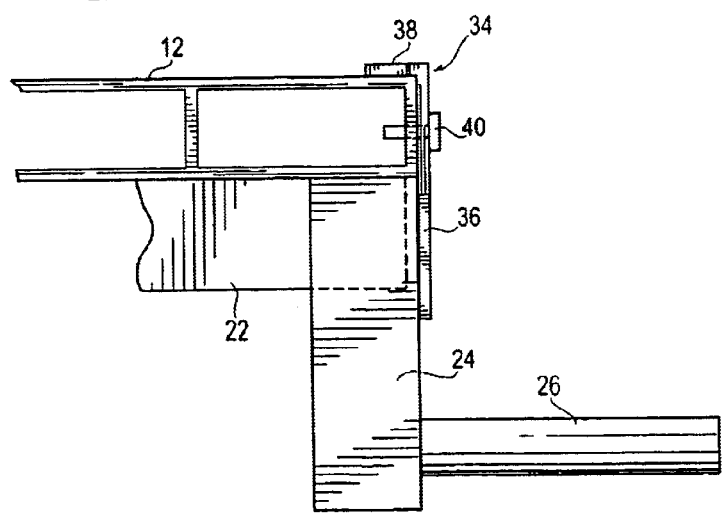

TRAILER AND KIT

BACKGROUND OF THE INVENTION

Trucks often have elongate loading ramp panels which are used in moving objects into and out of the truck bed. See, for example, my application Ser. No. 09/844,239, Carrier/Lift for a Truck Bed, now U.S. Pat. No. 6,705,820. Two elongate ramps are used in loading and unloading a wheeled vehicle on a carrier mounted in a truck bed. The present application is concerned with a kit utilizing two such elongate ramps or similar panels in a trailer and with the trailer construction.

BRIEF SUMMARY OF THE INVENTION

One feature of the invention is a kit for utilizing two elongate panels in a trailer, the kit comprising a wheel assembly for supporting the panels, a trailer drawbar having a first end for connection with a draft vehicle and a second end, a first fastener for securing the second end of the drawbar with the wheel assembly and a second fastener for securing the panels to the drawbar at a point spaced from the wheel assembly.

Another feature of the invention is that the wheel assembly has a transverse carrier bar between two wheel units and the first fastener secures the second end of the drawbar and the panels to the transverse carrier bar.

A further feature is that the second fastener comprises a transverse support bar which underlies the panels and drawbar and a bolt and clamp plate which secures the drawbar and panels to the transverse support bar.

Yet another feature of the invention is a trailer comprising two elongate panels, a wheel assembly supporting the panels, a trailer drawbar having a first end for connection with a draft vehicle and a second end, a first fastener securing the second end of the drawbar with the wheel assembly and a second fastener securing the panels to the drawbar at a point spaced from the wheel assembly.

BRIEF DESCRIPTION OF THE SEVERAL VIEWS OF THE DRAWING

Further features an advantages of the invention will be apparent from the following description and from the drawings in which:

FIG. 3 is an enlarged fragmentary section illustrating a portion of the wheel assembly, panels, and the first fastener;

FIG. 4 is a fragmentary side elevation of the trailer illustrating the second fastener;

FIG. 5 is a fragmentary section illustrating a portion of the wheel assembly with a panel resting on the transverse carrier bar; and FIG. 6 is a section through the first fastener taken along line 6—6 of FIG. 3.

DETAILED DESCRIPTION OF THE INVENTION

Figure 1:
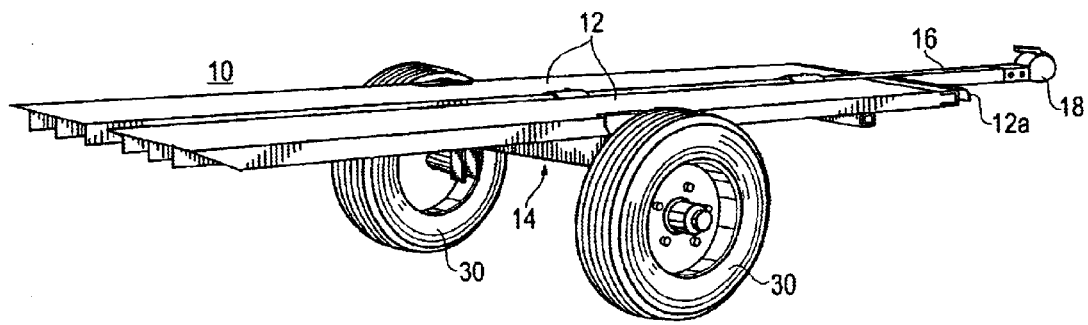
FIG. 1 is perspective view of a trailer embodying the invention.
Figure 2:
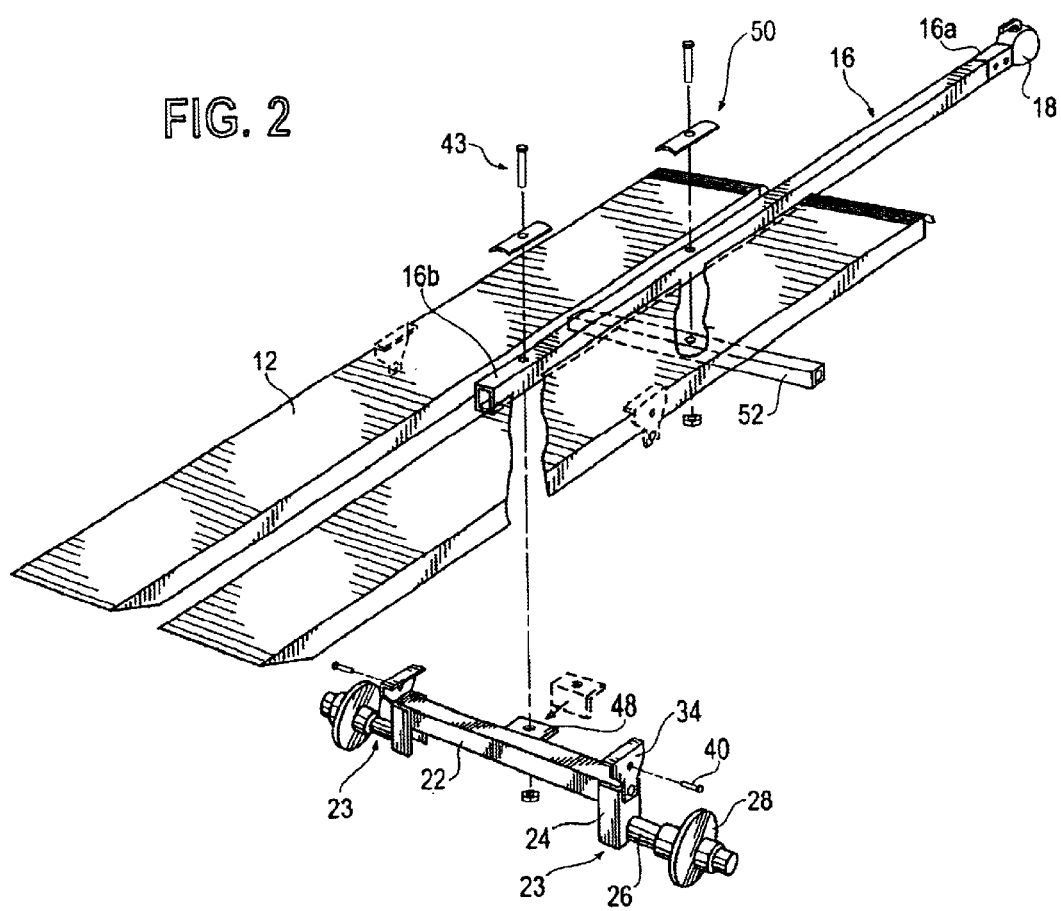
FIG. 2 is an exploded perspective view of the trailer without the wheels.

The trailer 10, FIGS. 1 and 2, comprises two elongate rectangular panels 12 which are illustrated as loading ramps having hooks 12a at one end for engaging a bar or other connector when used in loading or unloading a truck or the like. Such ramps are shown in my co-pending application Ser. No. 09/844,239 filed Apr. 25, 2001, now U.S. Pat. No. 6,705,820, where the ramps provide for loading and unloading a vehicle on a carrier/lift mounted in the bed of a pickup truck, and Ser. No. 10/219,554 filed Aug. 15, 2002 , now U.S. Pat. No. 6,692,055, for a loading ramp anchor bar.

Trailer 10 has a wheel assembly 14 on which the panels 12 are supported and a drawbar 16 which has a fitting 18 at the forward end 16a for connection with the trailer hitch of a draft vehicle (not shown).

The wheel assembly 14, FIG. 2, comprises a transverse carrier bar 22 on which panels 12 are supported. The carrier bar is preferably a square tubular member of steel but could take other forms and be of other materials, as a U shaped channel of aluminum. Wheel units 23 at each end of carrier bar 22, each has a downwardly extending leg 24 with an axle 26 extending outwardly from the lower end of the leg. Legs 24 are preferably a U shaped channel. Flanges 28 rotatable on axles 26 have wheels 30, FIG. 1, mounted thereon. Carrier bar 22 is several inches above axles 26, providing the trailer with clearance over obstructions on the ground.

Brackets 34 extend upwardly from legs 24 at the ends of carrier bar 22 to restrain and position panels 12 on carrier bar 22.

Bracket 34, FIG. 5, is L shaped with a vertical leg 36 and a horizontal leg 38 which engage panel 12 and restrain it from lateral and vertical movement, respectively, holding it on carrier bar 22. A pin 40 in the vertical leg of bracket 34 extends into hole 42 in the, edge of panel 12 establishing the position of wheel assembly 14 longitudinally of the panel.

Drawbar 16 extends longitudinally of the trailer between panels 12 and has a second end 16b secured to wheel assembly 14. A first fastener 43 comprising bolt 44 and clamp plate 46 fastens drawbar 16 to angle bracket 48 on the forward face of transverse carrier bar 22. Bolt 44 extends through clamp plate 48 which overlies the inner edges of panels 12 and secures them to carrier bar 22.

A second fastener 50 secures panels 12 to the drawbar 16 at a point spaced from the wheel assembly 14. The second fastener comprises a support bar 52 which extends transversely beneath panels 12, bolt 54 and clamp plate 56. Bolt 54 extends through drawbar 16 and support bar 52, and clamp plate 56 overlies the inner edges of panels 12 holding them to the support bar.

A kit is preferably provided with which the user can readily assemble the trailer from two loading ramps or similar elongate panels. The kit comprises:

1) wheel assembly 14
2) drawbar 16
3) first and second fasteners 43, 50

Assembly of the trailer requires only a wrench.

Panels 12 are positioned on the transverse carrier bar 22 of wheel assembly 14 and positioned by brackets 34 and pins 40. Drawbar 16 is placed between the panels and secured by the first fastener 43. Support bar 52 is placed below panels 12 and drawbar 16 and second fastener 50 secured to complete the assembly. The trailer is disassembled by reversing the procedure.

I claim:

1. A kit for utilizing two elongate panels in a trailer, comprising:

a wheel assembly for supporting the panels;

a trailer drawbar having a first end for connection with a draft vehicle and a second end;

a first fastener for securing the second end of the drawbar with said wheel assembly; and a second fastener for securing the panels to the drawbar at a point spaced from the wheel assembly, said second fastener comprising a transverse support bar which underlies the panels and drawbar and a clamp plate which overlies the drawbar and panels and secures the panels to the transverse support bar.

2. A trailer comprising:

two elongate panels;

a wheel assembly supporting the panels;

a trailer drawbar having a first end for connection with a draft vehicle and a second end;

a first fastener securing the second end of the drawbar with said wheel assembly; and a second fastener securing the panels to the drawbar at a point spaced from the wheel assembly, comprising a transverse support bar which underlies the panels and drawbar and a clamp plate which overlies the drawbar and panels and secures the panels to the transverse support bar.

3. A kit for utilizing two elongate panels in a trailer, comprising:

a wheel assembly comprising a transverse carrier bar between two wheel units for supporting the panels, each wheel unit having an axle on which a wheel is mounted and the transverse carrier bar joins the wheel units and is spaced above the axles;

a trailer drawbar having a first end for connection with a draft vehicle and a second end;

a first fastener for securing the second end of the drawbar with said wheel assembly and the panels to the transverse carrier bar; and a second fastener for securing the panels to the drawbar at a point spaced from the wheel assembly.

4. A trailer comprising:

two elongate panels;

a wheel assembly comprising a transverse carrier bar between two wheel units supporting the panels;

a trailer drawbar having a first end for connection with a draft vehicle and a second end;

a first fastener securing the second end of the drawbar with said wheel assembly and the panels to the transverse carrier bar including a clamp which overlies the panels and secures them to the transverse carrier bar; and a second fastener securing the panels to the drawbar at a point spaced from the wheel assembly.

5. A kit for utilizing two elongate panels in a trailer, comprising:

a wheel assembly comprising a transverse carrier bar between two wheel units for supporting the panels;

a trailer drawbar having a first end for connection with a draft vehicle and a second end;

a first fastener for securing the second end of the drawbar with said wheel assembly and the panels to the transverse carrier bar including a clamp plate which overlies the panels and secures them to the transverse carrier bar; and a second fastener for securing the panels to the drawbar at a point spaced from the wheel assembly.

6. The kit of claim 5 in which each wheel unit has a restraining surface which engages an upper edge of a panel and holds the panel on said carrier bar.

7. The kit of claim 5 in which each wheel unit has a positioning element which engages a complimentary surface of a panel to establish the position of the wheel assembly along the length of the panel.

8. The kit of claim 7 in which said positioning element is a pin which extends into a complimentary opening in the edge of the panel.

9. The kit of claim 5 for utilizing two elongate loading ramp panels in a trailer.

10. A trailer comprising:

two elongate panels;

a wheel assembly comprising a transverse carrier bar between two wheel units supporting the panels, each wheel unit having an axle on which a wheel is mounted and the transverse carrier bar joins the wheel units and is spaced above the axles;

a trailer drawbar having a first end for connection with a draft vehicle and a second end;

a first fastener securing the second end of the drawbar with said wheel assembly and the panels to the transverse carrier bar; and a second fastener securing the panels to the drawbar at a point spaced from the wheel assembly.

* * * * *